(12) United States Patent
Kameda (10) Patent No.: US 11,794,529 B2
(45) Date of Patent: Oct. 24, 2023

(54) RUN-FLAT TIRE

(71) Applicant: The Yokohama Rubber Co., LTD., Tokyo (JP)

(72) Inventor: Norifumi Kameda, Hiratsuka (JP)

(73) Assignee: he Yokohama Rubber Co., LTD., Tokyo (JP)

( * ) Notice: Subject to any disclaimer, the term of this patent is extended or adjusted under 35 U.S.C. 154(b) by 797 days.

(21) Appl. No.: 16/470,163

(22) PCT Filed: Oct. 31, 2017

(86) PCT No.: PCT/JP2017/039449
§ 371 (c)(1),
(2) Date: Jun. 14, 2019

(87) PCT Pub. No.: WO2018/116646
PCT Pub. Date: Jun. 28, 2018

(65) Prior Publication Data
US 2020/0016942 A1    Jan. 16, 2020

(30) Foreign Application Priority Data

Dec. 19, 2016 (JP) .................. 2016-245365

(51) Int. Cl.
*B60C 15/06* (2006.01)
*B60C 17/00* (2006.01)

(52) U.S. Cl.
CPC ...... *B60C 15/0607* (2013.01); *B60C 15/0603* (2013.01); *B60C 17/0009* (2013.01);
(Continued)

(58) Field of Classification Search
None
See application file for complete search history.

(56) References Cited

U.S. PATENT DOCUMENTS

| 2002/0003017 A1 | 1/2002 | Baumann et al. |
| 2007/0193669 A1 | 8/2007 | Giannini et al. |
| 2007/0272338 A1 | 11/2007 | Galimberti et al. |
| 2014/0034205 A1 | 2/2014 | Yukawa |
| 2015/0202929 A1 | 7/2015 | Horiuchi |
| 2016/0031267 A1 | 2/2016 | Horiuchi |

(Continued)

FOREIGN PATENT DOCUMENTS

| DE | 198 46 854 A1 | 4/2000 |
| DE | 60 2004 010 701 T2 | 12/2008 |

(Continued)

OTHER PUBLICATIONS

English machine translation of JP 2012-96656 A, May 24, 2012.*

(Continued)

*Primary Examiner* — Adrienne C. Johnstone
(74) *Attorney, Agent, or Firm* — THORPE NORTH & WESTERN (57) ABSTRACT

A run-flat tire includes side reinforcing rubber between a carcass layer and an innerliner layer in sidewall portions, first bead filler rubber arranged inside folded back portions of the carcass layer, and second bead filler rubber arranged outward of the folded back portions of the carcass layer in a lateral direction and along the carcass layer. In a meridian cross-section, a radial-direction height of the first bead filler rubber is 15% or greater and 40% or less of a cross-sectional height, a radial-direction height of the second bead filler rubber is 35% or greater and 55% or less of the cross-sectional height, a linear distance from a radial-direction outer end to a radial-direction inner end of the second bead filler rubber is 20% or greater and 45% or less of the cross-sectional height, and the second bead filler rubber has a larger cross-sectional area than the first bead filler rubber.

10 Claims, 4 Drawing Sheets

(52) U.S. Cl.
CPC .......................... *B60C 2015/061* (2013.01);
*B60C 2015/0621* (2013.01); *B60C 2017/0054*
(2013.01); *B60C 2017/0063* (2013.01); *B60C
2017/0072* (2013.01); *Y10T 152/10837*
(2015.01); *Y10T 152/10846* (2015.01)

(56) References Cited

U.S. PATENT DOCUMENTS

| | | | |
|---|---|---|---|
| 2016/0236521 | A1 | 8/2016 | Yukawa |
| 2017/0197478 | A1* | 7/2017 | Mitarai ............... B60C 17/0009 |
| 2020/0324583 | A1* | 10/2020 | Kameda ............... B60C 15/0607 |

FOREIGN PATENT DOCUMENTS

| | | |
|---|---|---|
| JP | 2012-096656 | 5/2012 |
| JP | 2014-054967 | 3/2014 |
| JP | 2015-067256 | 4/2015 |
| JP | 2015-098198 | 5/2015 |
| JP | 2015-205594 | 11/2015 |
| JP | 5835171 | 12/2015 |
| WO | WO 2005/044596 | 5/2005 |
| WO | WO 2010/000299 | 1/2010 |
| WO | WO 2014/042035 | 3/2014 |
| WO | WO 2014/141880 | 9/2014 |
| WO | WO 2015/072322 | 5/2015 |

OTHER PUBLICATIONS

Mechanics of Pneumatic Tires, ed. Samuel Clark, US Department of Transportation, Aug. 1981, p. 209.*
International Search Report for International Application No. PCT/JP2017/039449 dated Jan. 16, 2018, 4 pages, Japan.

* cited by examiner

| | CONVENTIONAL EXAMPLE | COMPARATIVE EXAMPLE 1 | COMPARATIVE EXAMPLE 2 | EXAMPLE 1 | EXAMPLE 2 |
|---|---|---|---|---|---|
| RATIO OF TIRE-RADIAL-DIRECTION HEIGHT H1 OF FIRST BEAD FILLER RUBBER: TIRE CROSS-SECTIONAL HEIGHT SH (%) | 45 | 15 | 45 | 15 | 40 |
| RATIO OF TIRE-RADIAL-DIRECTION HEIGHT H2 OF SECOND BEAD FILLER RUBBER: TIRE CROSS-SECTIONAL HEIGHT SH (%) | | 60 | 30 | 35 | 55 |
| LINEAR DISTANCE W BETWEEN ENDS OF SECOND BEAD FILLER RUBBER: TIRE CROSS-SECTIONAL HEIGHT SH (%) | 55 | 55 | 25 | 25 | 45 |
| CROSS-SECTIONAL AREA OF SECOND BEAD FILLER RUBBER WITH RESPECT TO CROSS-SECTIONAL AREA OF FIRST BEAD FILLER RUBBER (+ OR -) | | + | - | + | + |
| RATIO OF CROSS-SECTIONAL AREA OF FIRST BEAD FILLER RUBBER AND SECOND BEAD FILLER RUBBER: CROSS-SECTIONAL AREA OF SIDE REINFORCING RUBBER (%) | 55 | 55 | 55 | 20 | 50 |
| (GA1 + GA2)/GBmax(%) | 35 | 45 | 45 | 45 | 95 |
| GB/GBmax(%) | 45 | 45 | 45 | 45 | 10 |
| OVERLAP AMOUNT L (mm) BETWEEN FIRST BEAD FILLER RUBBER AND SIDE REINFORCING RUBBER | 30 | 10 | 30 | 5 | 25 |
| RATIO OF OVERLAP AMOUNT L BETWEEN FIRST BEAD FILLER RUBBER AND SIDE REINFORCING RUBBER: TIRE CROSS-SECTIONAL HEIGHT SH (%) | 26 | 9 | 26 | 4 | 21 |
| GA1/GA2 | | 0.9 | 1.5 | 1.2 | 1.2 |
| RATIO OF POSITION OF GBmax: TIRE-RADIAL-DIRECTION HEIGHT H2 OF SECOND BEAD FILLER RUBBER (%) | | 100 | 200 | 171 | 109 |
| RATIO OF POSITION OF GBmax: TIRE CROSS-SECTIONAL HEIGHT (%) | 60 | 60 | 60 | 60 | 60 |
| GBmax/GCmax(%) | 45 | 45 | 45 | 35 | 35 |
| JIS-A HARDNESS OF SIDE REINFORCING RUBBER AT 20°C | 80 | 80 | 80 | 80 | 80 |
| TAN δ OF SIDE REINFORCING RUBBER AT 60°C | 0.03 | 0.03 | 0.03 | 0.03 | 0.03 |
| JIS-A HARDNESS OF FIRST BEAD FILLER RUBBER AT 20°C | 80 | 80 | 80 | 80 | 80 |
| TAN δ OF FIRST BEAD FILLER RUBBER AT 60°C | 0.03 | 0.03 | 0.03 | 0.03 | 0.03 |
| JIS-A HARDNESS OF SECOND BEAD FILLER RUBBER AT 20°C | | 80 | 80 | 80 | 80 |
| TAN δ OF SECOND BEAD FILLER RUBBER AT 60°C | | 0.03 | 0.03 | 0.03 | 0.03 |
| RUN-FLAT DURABILITY PERFORMANCE | 100 | 97 | 100 | 101 | 115 |
| RIDE COMFORT PERFORMANCE | 100 | 97 | 97 | 125 | 101 |

FIG. 3A

| | EXAMPLE 3 | EXAMPLE 4 | EXAMPLE 5 | EXAMPLE 6 | EXAMPLE 7 | EXAMPLE 8 | EXAMPLE 9 |
|---|---|---|---|---|---|---|---|
| RATIO OF TIRE-RADIAL-DIRECTION HEIGHT H1 OF FIRST BEAD FILLER RUBBER: TIRE CROSS-SECTIONAL HEIGHT SH (%) | 35 | 35 | 35 | 35 | 35 | 35 | 35 |
| RATIO OF TIRE-RADIAL-DIRECTION HEIGHT H2 OF SECOND BEAD FILLER RUBBER: TIRE CROSS-SECTIONAL HEIGHT SH (%) | 50 | 50 | 50 | 50 | 50 | 50 | 50 |
| LINEAR DISTANCE W BETWEEN ENDS OF SECOND BEAD FILLER RUBBER: TIRE CROSS-SECTIONAL HEIGHT SH (%) | 35 | 35 | 35 | 35 | 35 | 35 | 35 |
| CROSS-SECTIONAL AREA OF SECOND BEAD FILLER RUBBER WITH RESPECT TO CROSS-SECTIONAL AREA OF FIRST BEAD FILLER RUBBER (+ OR -) | + | + | + | + | + | + | + |
| RATIO OF CROSS-SECTIONAL AREA OF FIRST BEAD FILLER RUBBER AND SECOND BEAD FILLER RUBBER: CROSS-SECTIONAL AREA OF SIDE REINFORCING RUBBER (%) | 20 | 35 | 40 | 40 | 40 | 40 | 40 |
| (GA1 + GA2)/GBmax(%) | 50 | 55 | 65 | 65 | 65 | 65 | 65 |
| GB/GBmax(%) | 45 | 45 | 35 | 35 | 35 | 35 | 35 |
| OVERLAP AMOUNT L (mm) BETWEEN FIRST BEAD FILLER RUBBER AND SIDE REINFORCING RUBBER | 5 | 5 | 5 | 25 | 25 | 25 | 25 |
| RATIO OF OVERLAP AMOUNT L BETWEEN FIRST BEAD FILLER RUBBER AND SIDE REINFORCING RUBBER: TIRE CROSS-SECTIONAL HEIGHT SH (%) | 4 | 4 | 4 | 21 | 21 | 21 | 21 |
| GA1/GA2 | 1.2 | 1.2 | 1.2 | 1.2 | 0.8 | 0.8 | 0.8 |
| RATIO OF POSITION OF GBmax: TIRE-RADIAL-DIRECTION HEIGHT H2 OF SECOND BEAD FILLER RUBBER (%) | 124 | 124 | 124 | 124 | 124 | 110 | 110 |
| GBmax/GCmax(%) | 62 | 62 | 62 | 62 | 62 | 55 | 55 |
| JIS-A HARDNESS OF SIDE REINFORCING RUBBER AT 20°C | 52 | 52 | 52 | 52 | 52 | 40 | 40 |
| TAN δ OF SIDE REINFORCING RUBBER AT 60°C | 0.03 | 0.03 | 0.03 | 0.03 | 0.03 | 0.03 | 0.03 |
| JIS-A HARDNESS OF FIRST BEAD FILLER RUBBER AT 20°C | 80 | 80 | 80 | 80 | 80 | 80 | 77 |
| TAN δ OF FIRST BEAD FILLER RUBBER AT 60°C | 0.03 | 0.03 | 0.03 | 0.03 | 0.03 | 0.03 | 0.02 |
| JIS-A HARDNESS OF SECOND BEAD FILLER RUBBER AT 20°C | 80 | 80 | 80 | 80 | 80 | 80 | 72 |
| TAN δ OF SECOND BEAD FILLER RUBBER AT 60°C | 0.03 | 0.03 | 0.03 | 0.03 | 0.03 | 0.03 | 0.02 |
| RUN-FLAT DURABILITY PERFORMANCE | 105 | 110 | 115 | 120 | 120 | 125 | 130 |
| RIDE COMFORT PERFORMANCE | 103 | 106 | 109 | 109 | 112 | 115 | 118 |

FIG. 3B

RUN-FLAT TIRE

TECHNICAL FIELD

The present technology relates to a run-flat tire.

BACKGROUND ART

Pneumatic tires are assembled on rims, inflated with air, and mounted on a vehicle. When a vehicle is traveling, it is this internal air pressure that bears the load. However, upon puncture or the like, air escapes from the pneumatic tire, rendering the tire unsuitable to bear the load. Specifically, the load supported by the air pressure becomes supported by the sidewall portions, causing the sidewall portions to greatly deform. As a result, travel is impeded.

Pneumatic tires are known to take such issues into account. Such tires are capable of run-flat travel in which a vehicle travels with air escaping from the tires due to a puncture or the like. The tires are provided with a side reinforcing rubber to the inside of the sidewall portions which increases the bending rigidity of the sidewall portions. In other words, deformation of the sidewall portions of such pneumatic tires is suppressed, allowing the pneumatic tire to travel even in a state in which some of the air inflating the pneumatic tire has escaped and a large load is borne by the sidewall portions.

In the related art, for example, a run-flat tire described in Japan Patent No. 5835171 is intended to achieve durability during run-flat traveling and ride comfort under normal travel conditions to a high degree and to minimize an increase in weight. In this run-flat tire, a minimum wall thickness portion within a range from a central position of a tread portion to a tire maximum width position is arranged between an end portion of each belt layer and a position at 70% of a tire cross-sectional height SH, a relationship between a thickness Gmin of the minimum wall thickness portion and a thickness Gmax of a maximum wall thickness portion at a sidewall portion is $0.5 \times Gmax \leq Gmin \leq 0.8 \times Gmax$, a relationship between the tire cross-sectional height SH and a length L min, on a tire outer surface at a tire meridian cross section, of a thin wall region having a difference of 1 mm or less in thickness from a minimum thickness portion is $0.18 \times SH \leq Lmin \leq 0.26 \times SH$, a relationship among a weight Wr of a side reinforcing layer, a total weight Wt of the tire, and a tire flattening rate R (%) is $0.08 \times Wt \times (1-0.2 \times (1-R/50)) \leq Wr \leq 0.18 \times Wt \times (1-0.2 \times (1-R/50))$, a relationship between a thickness Ga at a rim check line position of an outer rubber portion located outward of a carcass layer and a maximum thickness Gb at the sidewall portion of the outer rubber portion is $0.8 \times Gb \leq Ga \leq 1.0 \times Gb$, and a relationship between a thickness Gc at a rim check line position of an inner rubber portion located inward of the carcass layer and the thickness Ga at a rim check line position of the outer rubber portion is $0.7 \times Ga \leq Gc \leq 1.0 \times Ga$.

Furthermore, in the related art, for example, a pneumatic tire described in Japan Unexamined Patent Publication No. 2015-67256 is intended to reduce vertical rigidity and rolling resistance without degrading durability during puncture. In this pneumatic tire, a bead includes a ring-shaped core; and a first apex and a second apex that are tapered outward in a radial direction. A carcass ply is folded back around the core from an inner side toward an outer side in an axial direction. The fold-back forms a main portion and a folded back portion in the carcass ply. The first apex is positioned between the main portion and the folded back portion. The second apex is positioned outward of the folded back portion in the axial direction. When a reference height HW is defined as a radial height from a bead baseline to a position on an outer surface where the tire exhibits a maximum width in the axial direction, a ratio of a radial height HS from the bead baseline to an outer end of the second apex, to the reference height HW is 0.8 or greater and 1.3 or less. A ratio of a radial height HB from the bead baseline to an outer end of the first apex, to the reference height HW is 0.2 or greater and 0.6 or less.

However, for the run-flat tires, the thickness of the side reinforcing rubber in a tire lateral direction may be increased to improve steering stability performance during run-flat traveling. However, this increases a longitudinal stiffness in a tire radial direction, which tends to degrade ride comfort performance. On the other hand, reducing the thickness of the reinforcing rubber in the tire lateral direction to improve ride comfort performance tends to cause a decrease in durability performance when run-flat traveling (run-flat durability performance).

SUMMARY

The present technology provides a run-flat tire that can achieve steering stability, wear resistance, and wet performance in a compatible manner.

The present technology provides a run-flat tire including a tread portion, sidewall portions arranged on opposite sides of the tread portion, bead portions arranged inward of the sidewall portions in a tire radial direction, a carcass layer extending from the tread portion through the sidewall portions to the bead portions, end portions of the carcass layer being folded back at the bead portions outward in a tire lateral direction, the carcass layer being wound in a tire circumferential direction, an innerliner layer arranged around an inner circumference of the carcass layer, side reinforcing rubber arranged between the carcass layer and the innerliner layer in the sidewall portions, first bead filler rubber arranged inside folded back portions of the carcass layer, and second bead filler rubber arranged outward of the folded back portions of the carcass layer in the tire lateral direction and along the carcass layer, wherein, in a meridian cross-section, a tire-radial-direction height of the first bead filler rubber satisfies a range of 15% or greater and 40% or less of a tire cross-sectional height, a tire-radial-direction height of the second bead filler rubber satisfies a range of 35% or greater and 55% or less of the tire cross-sectional height, a linear distance from a tire-radial-direction outer end to a tire-radial-direction inner end of the second bead filler rubber satisfies a range of 20% or greater and 45% or less of the tire cross-sectional height, and the second bead filler rubber has a larger cross-sectional area than the first bead filler rubber.

In the run-flat tire, the first bead filler rubber is provided within an tire-radial-direction arrangement range of 15% or greater and 40% or less of the tire cross-sectional height, the second bead filler rubber is provided within a tire-radial-direction arrangement range of 35% or greater and 55% or less of the tire cross-sectional height, and the linear distance between the tire-radial-direction outer end and the tire-radial-direction inner end of the second bead filler rubber is provided within the range of 20% or greater and 45% or less of the tire cross-sectional height. This enables an appropriate rubber gauge (rubber amount) to be ensured for the bead portions, allowing appropriate run-flat durability performance to be ensured. Additionally, the second bead filler rubber has a larger cross-sectional area than the first bead filler rubber. This enables a reduction in size of the first bead filler rubber, allowing appropriate ride comfort performance to be ensured. As a result, both run-flat durability performance and ride comfort performance can be achieved in a compatible manner.

Additionally, in the run-flat tire according to an aspect of the present technology, preferably, in the meridian cross-section, a total of the cross-sectional area of the first bead filler rubber and the cross-sectional area of the second bead filler rubber satisfies a range of 25% or greater and 45% or less of a cross-sectional area of the side reinforcing rubber.

In the run-flat tire, in a case where the total of the cross-sectional area of the first bead filler rubber and the cross-sectional area of the second bead filler rubber is 25% or greater of the cross-sectional area of the side reinforcing rubber, a larger rubber gauge (rubber amount) can be ensured for the bead portions, allowing the run-flat durability performance to be improved. On the other hand, in a case where the total of the cross-sectional area of the first bead filler rubber and the cross-sectional area of the second bead filler rubber is 45% or less of the cross-sectional area of the side reinforcing rubber, an excess rubber gauge (rubber amount) in the bead portions is inhibited, allowing the ride comfort performance to be improved. Furthermore, a possible heat build-up in the rubber is inhibited to allow appropriate run-flat durability performance to be ensured.

Additionally, in the run-flat tire according to an aspect of the present technology, preferably, in the meridian cross-section, a normal line is drawn that is normal to an inner surface of the innerliner layer and that passes through a midpoint of a straight line connecting a tire-radial-direction outer end of the first bead filler rubber to a tire-radial-direction inner end of the side reinforcing rubber, a total of a thickness of the first bead filler rubber on the normal line and a thickness of the second bead filler rubber on the normal line satisfies a range of 60% or greater and 90% or less of a maximum thickness of the side reinforcing rubber, and a thickness of the side reinforcing rubber on the normal line satisfies a range of 15% or greater and 40% or less of the maximum thickness of the side reinforcing rubber.

In the run-flat tire, in a case where the total of the thickness of the first bead filler rubber and the thickness of the second bead filler rubber on the normal line satisfies a range of 60% or greater of the maximum thickness of the side reinforcing rubber, a larger rubber gauge (rubber amount) can be ensured for the bead portions to allow the run-flat durability performance to be improved. On the other hand, in a case where the total of the thickness of the first bead filler rubber and the thickness of the second bead filler rubber on the normal line is 90% or less of the maximum thickness of the side reinforcing rubber, an excess rubber gauge (rubber amount) in the bead portions is inhibited to allow the ride comfort performance to be improved. Furthermore, a possible heat build-up in the rubber is inhibited to allow appropriate run-flat durability performance to be ensured. Moreover, in a case where the thickness of the side reinforcing rubber on the normal line is 15% or greater of the maximum thickness of the side reinforcing rubber, a larger rubber gauge (rubber amount) can be ensured for the bead portions, allowing the run-flat durability performance to be improved. On the other hand, in a case where the thickness of the side reinforcing rubber on the normal line is 40% or less of the maximum thickness of the side reinforcing rubber, an excess rubber gauge (rubber amount) in the bead portions is inhibited to allow the ride comfort performance to be improved. Furthermore, a possible heat build-up in the rubber is inhibited to allow appropriate run-flat durability performance to be ensured.

Additionally, in the run-flat tire according to an aspect of the present technology, preferably, in the meridian cross-section, the normal line is drawn that is normal to the inner surface of the innerliner layer and that passes through the midpoint of the straight line connecting the tire-radial-direction outer end of the first bead filler rubber to the tire-radial-direction inner end of the side reinforcing rubber, a distance between a straight line extending parallel with the normal line and through the tire-radial-direction outer end of the first bead filler rubber and a straight line extending parallel with the normal line and through the tire-radial-direction inner end of the side reinforcing rubber satisfies a range of 10 mm or greater and 25% or less of the tire cross-sectional height.

In the run-flat tire, in a case where the distance between the straight line extending parallel with the normal line and through the tire-radial-direction outer end of the first bead filler rubber and the straight line extending parallel with the normal line and through the tire-radial-direction inner end of the side reinforcing rubber is 10 mm or greater, appropriate rigidity of the bead portion is ensured to allow the run-flat durability performance to be improved. On the other hand, in a case where the distance is 25% or less of the tire cross-sectional height, an excess rubber gauge (rubber amount) in the bead portions is inhibited to allow the ride comfort performance to be improved. Furthermore, a possible heat build-up in the rubber resulting from an excess rubber gauge (rubber amount) is inhibited to allow appropriate run-flat durability performance to be ensured.

Additionally, in the run-flat tire according to an aspect of the present technology, preferably, in the meridian cross-section, the normal line is drawn that is normal to the inner surface of the innerliner layer and that passes through the midpoint of the straight line connecting the tire-radial-direction outer end of the first bead filler rubber to the tire-radial-direction inner end of the side reinforcing rubber, the thickness of the first bead filler rubber on the normal line is smaller than the thickness of the second bead filler rubber on the normal line.

In the run-flat tire, the first bead filler rubber arranged inside the folded back portions of the carcass layer is reduced in size. Thus, excess rigidity of the bead portions is inhibited to allow the ride comfort performance to be improved.

Additionally, in the run-flat tire according to an aspect of the present technology, preferably, in the meridian cross-section, a position of the maximum thickness of the side reinforcing rubber lies outward, in the tire radial direction, of 90% of the tire-radial-direction height of the second bead filler rubber and lies inward, in the tire radial direction, of 60% of the tire cross-sectional height, and the maximum thickness of the side reinforcing rubber satisfies a range of 35% or greater and 50% or less of a maximum thickness of the sidewall portions.

In the run-flat tire, in a case where the position of the maximum thickness of the side reinforcing rubber lies outward of 90% of the tire-radial-direction height of the second bead filler rubber, an overlap between the side reinforcing rubber and the second bead filler rubber is small. This inhibits excess rigidity to allow the ride comfort performance to be improved. Additionally, in the run-flat tire, in a case where the position of the maximum thickness of the side reinforcing rubber lies inward of 60% of the tire cross-sectional height, the portion of the maximum thickness of the side reinforcing rubber is located further inward in the tire radial direction. This inhibits excess rigidity to allow the ride comfort performance to be improved. Moreover, in a case where the maximum thickness of the side reinforcing rubber is 35% or greater of the maximum thickness of the sidewall portions, appropriate rigidity of the side reinforcing rubber is ensured to allow the run-flat durability performance to be improved. On the other hand, in a case where the maximum thickness of the side reinforcing rubber is 50% or less of the maximum thickness of the sidewall portions, excess rigidity of the sidewall portions is inhibited to allow the ride comfort performance to be improved. Furthermore, a possible heat build-up in the rubber resulting from an excess rubber gauge (rubber amount) is inhibited to allow appropriate run-flat durability performance to be ensured.

Additionally, in the run-flat tire according to an aspect of the present technology, preferably, the side reinforcing rubber has a tan δ of a range of 0.01 or greater and 0.08 or less at 60° C. and has a JIS (Japanese Industrial Standard)-A hardness of a range of 72 or greater and 82 or less at 20° C., and at least one of the first bead filler rubber or the second bead filler rubber has a tan δ of a range of 0.01 or greater and 0.08 or less at 60° C. and has a JIS-A hardness of a range of 67 or greater and 77 or less at 20° C.

In the run-flat tire, the side reinforcing rubber having a tan δ of 0.01 or greater at 60° C. is advantageous in terms of productivity and costs of rubber compositions, and the side reinforcing rubber having a tan δ of 0.08 or less at 60° C. can have a rigidity (hardness) advantageous to the run-flat durability performance. Additionally, the side reinforcing rubber having a JIS-A hardness of 72 or greater at 20° C. can have a rigidity (hardness) advantageous to the run-flat durability performance, and the side reinforcing rubber having a JIS-A hardness of 82 or less at 20° C. can have a softness advantageous to the ride comfort performance. Moreover, at least one of the first bead filler rubber or the second bead filler rubber having a tan δ of 0.01 or greater at 60° C. is advantageous in terms of productivity and costs of rubber compositions, and at least one of the first bead filler rubber or the second bead filler rubber having a tan δ of 0.08 or less at 60° C. can have a rigidity (hardness) advantageous to the run-flat durability performance. Additionally, at least one of the first bead filler rubber or the second bead filler rubber having a JIS-A hardness of 67 or greater at 20° C. can have a hardness advantageous to the run-flat durability performance, and at least one of the first bead filler rubber or the second bead filler rubber having a JIS-A hardness of 77 or less at 20° C. can have a softness advantageous to the ride comfort performance.

Additionally, in the run-flat tire according to an aspect of the present technology, preferably, the side reinforcing rubber has a tan δ of a range of 0.01 or greater and 0.08 or less at 60° C. and has a JIS-A hardness of a range of 72 or greater and 82 or less at 20° C., and the first bead filler rubber and the second bead filler rubber have a tan δ of a range of 0.01 or greater and 0.08 or less at 60° C. and have a JIS-A hardness of a range of 67 or greater and 77 or less at 20° C.

In the run-flat tire, the side reinforcing rubber having a tan δ of 0.01 or greater at 60° C. is advantageous in terms of productivity and costs of rubber compositions, and the side reinforcing rubber having a tan δ of 0.08 or less at 60° C. can have a rigidity (hardness) advantageous to the run-flat durability performance. Additionally, the side reinforcing rubber having a JIS-A hardness of 72 or greater at 20° C. can have a rigidity (hardness) advantageous to the run-flat durability performance, and the side reinforcing rubber having a JIS-A hardness of 82 or less at 20° C. can have a softness advantageous to the ride comfort performance. Moreover, the first bead filler rubber and the second bead filler rubber having a tan δ of 0.01 or greater at 60° C. are advantageous in terms of productivity and costs of rubber compositions, and the first bead filler rubber and the second bead filler rubber having a tan δ of 0.08 or less at 60° C. can have a rigidity (hardness) advantageous to the run-flat durability performance. Additionally, the first bead filler rubber and the second bead filler rubber having a JIS-A hardness of 67 or greater at 20° C. can have a hardness advantageous to the run-flat durability performance, and the first bead filler rubber and the second bead filler rubber having a JIS-A hardness of 77 or less at 20° C. can have a softness advantageous to the ride comfort performance.

The run-flat tire according to the present technology allows run-flat durability performance and ride comfort performance to be achieved in a compatible manner.

BRIEF DESCRIPTION OF DRAWINGS

FIGS. 3A-3B include a table showing the results of performance tests of run-flat tires according to examples of the present technology.

DETAILED DESCRIPTION

An embodiment of the present technology is described in detail below with reference to the drawings. However, the present technology is not limited by the embodiment. Constituents of the embodiment include elements that are essentially identical or that can be substituted or easily conceived by one skilled in the art. Furthermore, the modified examples described in the embodiment can be combined as desired within the scope apparent to one skilled in the art.

Figure 1:
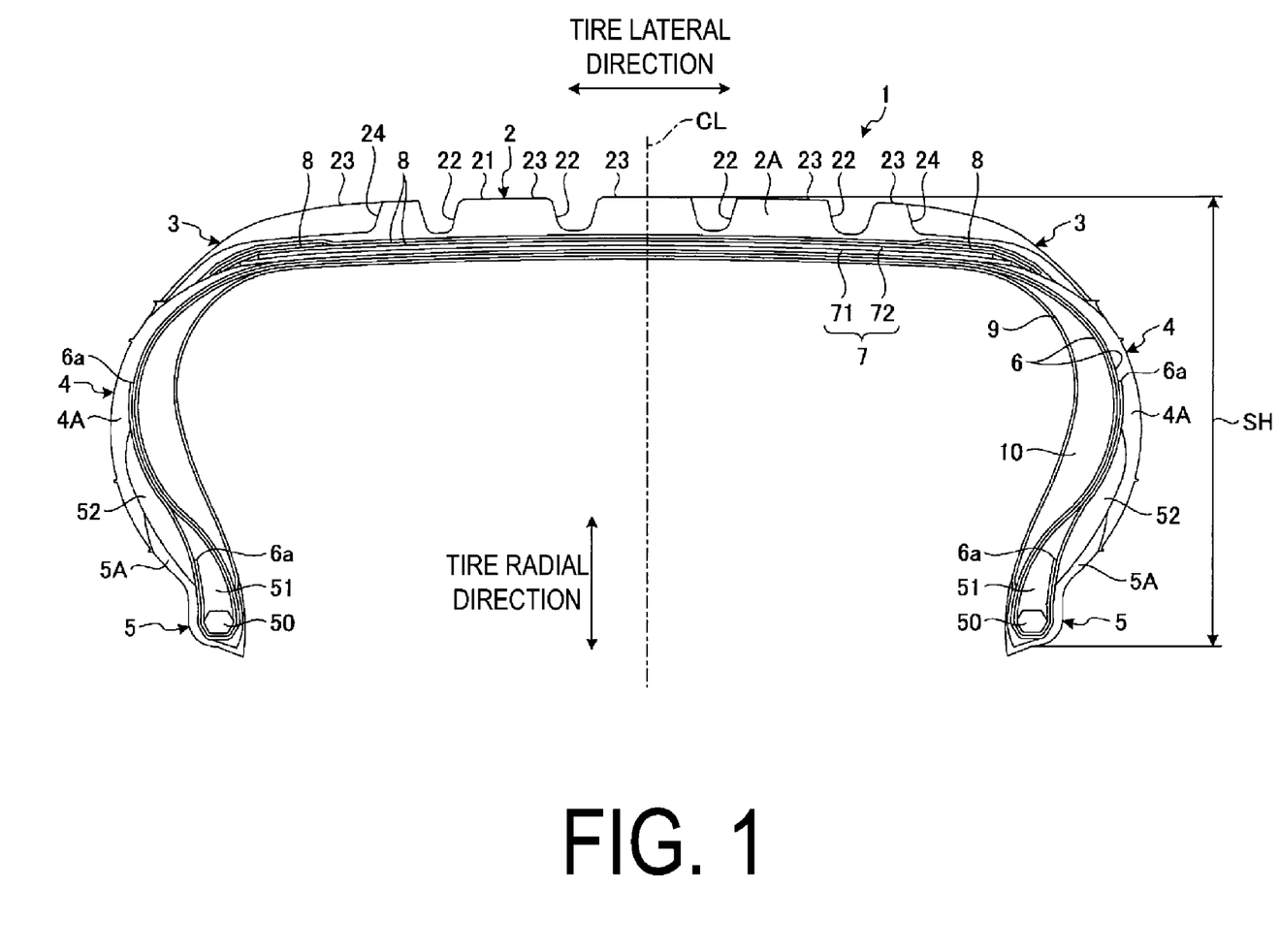
FIG. 1 is a meridian cross-sectional view illustrating a run-flat tire according to an embodiment of the present technology.
Figure 2:
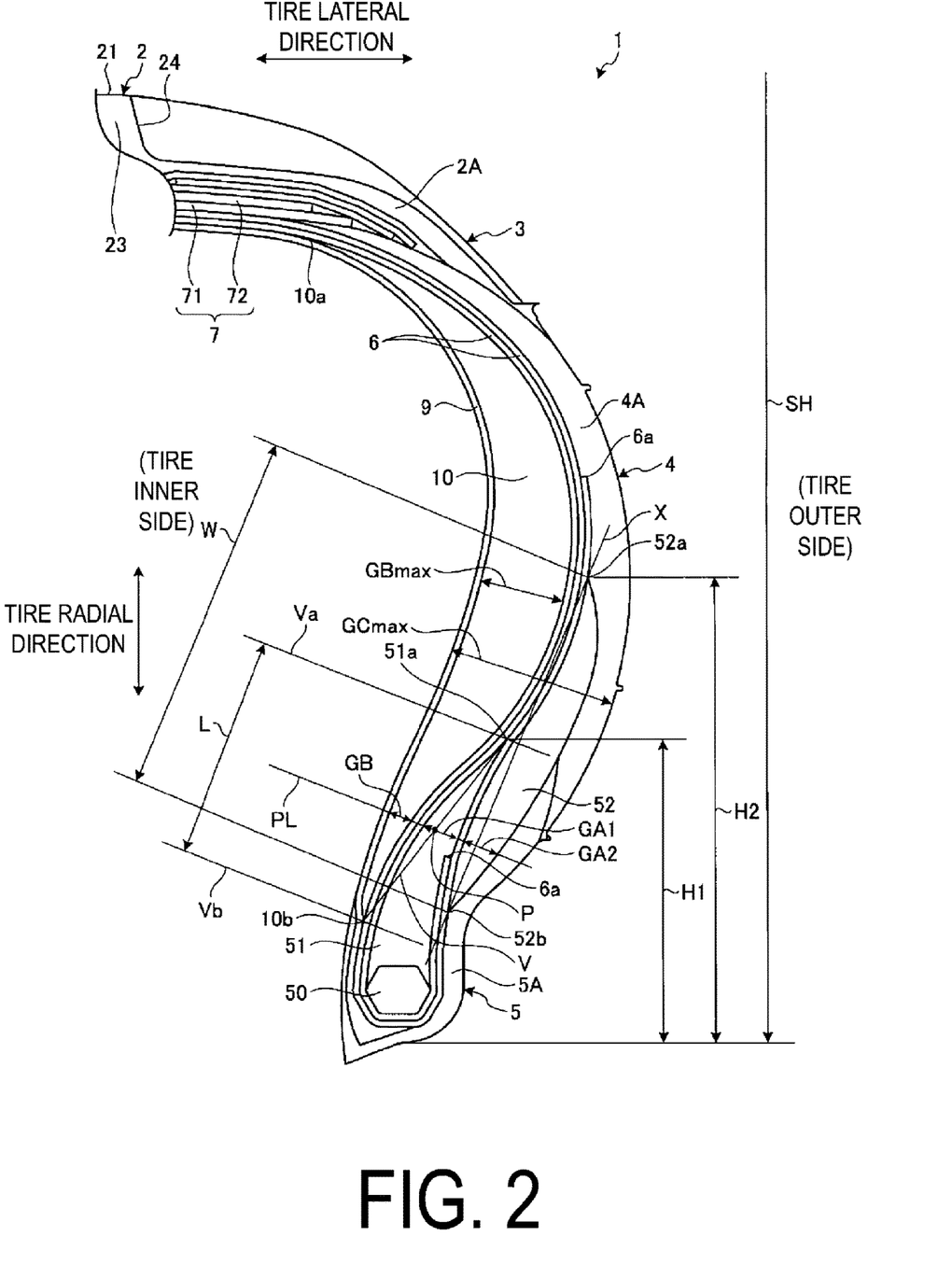
FIG. 2 is an enlarged meridian cross-sectional view of a portion of a run-flat tire according to an embodiment of the present technology.

FIG. 1 is a meridian cross-sectional view of a run-flat tire according to the present embodiment. FIG. 2 is an enlarged meridian cross-sectional view of a portion of the run-flat tire according to the present embodiment.

Herein, "tire radial direction" refers to a direction orthogonal to a rotation axis (not illustrated in the drawings) of a pneumatic tire 1 (run-flat tire). "Inward in the tire radial direction" refers to the direction toward the rotation axis in the tire radial direction. "Outward in the tire radial direction" refers to the direction away from the axis of rotation in the tire radial direction. "Tire circumferential direction" refers to a circumferential direction with the rotation axis as a center axis. Additionally, "tire lateral direction" refers to a direction parallel with the rotation axis P. "Inward in the tire lateral direction" refers to a direction toward a tire equatorial plane (tire equator line) CL in the tire lateral direction. "Outward in the tire lateral direction" refers to a direction away from the tire equatorial plane CL in the tire lateral direction. "Tire equatorial plane CL" refers to a plane orthogonal to the rotation axis of the run-flat tire 1 that passes through the center of the tire width of the run-flat tire 1. "Tire width" is the width in the tire lateral direction between components located outward in the tire lateral direction, or, in other words, the distance between the components that are the most distant from the tire equatorial plane CL in the tire lateral direction. "Tire equator line" refers to the line in the tire circumferential direction of the pneumatic tire 1 that lies on the tire equatorial plane CL. In the present embodiment, the tire equator line and the tire equatorial plane are denoted by the same reference sign CL.

As illustrated in FIG. 1, the run-flat tire 1 of the present embodiment includes a tread portion 2, shoulder portions 3 on opposite sides of the tread portion 2, and sidewall portions 4 and bead portions 5 continuing from the shoulder portions 3 in that order. The run-flat tire 1 also includes a carcass layer 6, a belt layer 7, a belt reinforcing layer 8, an innerliner layer 9, and a side reinforcing rubber 10.

The tread portion 2 is made of tread rubber 2A and is exposed on an outermost side of the run-flat tire 1 in the tire radial direction, with a surface thereof constituting a profile of the run-flat tire 1. A tread surface 21 is formed on an outer circumferential surface of the tread portion 2, in other words, on a road contact surface that comes into contact with a road surface when running. The tread surface 21 is provided with a plurality (four in the present embodiment) of main grooves 22 that are straight main grooves extending in the tire circumferential direction parallel with the tire equator line CL. Moreover, a plurality of rib-like land portions 23 that extend in the tire circumferential direction are formed in the tread surface 21 by the plurality of main grooves 22. Note that the main grooves 22 may extend in the tire circumferential direction in a bending or curving manner. Additionally, in the tread portion 2, lug grooves 24 that extend in a direction that intersects the tire circumferential direction are provided in the land portions 23 of the tread surface 21. The lug grooves 24 may communicate with the main grooves 22. Alternatively, the lug grooves 24 may include at least one end that does not communicate with the main grooves 22 and terminates within the land portion 23. When both ends of the lug grooves 24 communicate with the main grooves 22, the land portions 23 are formed into a plurality of block-like land portions divided in the tire circumferential direction. Note that the lug grooves 24 may extend inclined with respect to the tire circumferential direction in a bending or curving manner.

The shoulder portions 3 are portions of the tread portion 2 located outward in the tire lateral direction on both sides. In other words, the shoulder portions 3 are made of the tread rubber 2A. Additionally, the sidewall portions 4 are exposed on the outermost sides of the run-flat tire 1 in the tire lateral direction. The sidewall portions 4 are each made of side rubber 4A. The bead portions 5 each include a bead core 50, first bead filler rubber 51, and second bead filler rubber 52. The bead core 50 is formed by winding a bead wire, which is a steel wire, into a ring shape. The first bead filler rubber 51 is a rubber material that is disposed inside a folded back portion where an end portion of the carcass layer 6 in the tire lateral direction is folded back at the position of the bead core 50. The second bead filler rubber 52 is a rubber material that is disposed along the carcass layer 6 outward, in the tire lateral direction, (tire outer side) of the folded back portion where the end portion of the carcass layer 6 in the tire lateral direction is folded back at the position of the bead core 50. The bead portions 5 each include a rim cushion rubber 5A at a portion on the tire outer side that comes into contact with a rim (not illustrated). The rim cushion rubber 5A constitutes the outer circumference of the bead portion 5. The rim cushion rubber 5A extends from a tire inner side of the bead portion 5 around a lower end portion thereof, which is in contact with the rim, covers a part (tire-radial-direction inner portion) of the second bead filler rubber 52 on the tire outer side, and reaches a tire-radial-direction inner end of the side rubber 4A of the sidewall portions 4. Note that the tire-radial-direction inner portion of the side rubber 4A of the sidewall portions 4 covers a part (tire-radial-direction outer portion) of the second bead filler rubber 52 on the tire outer side.

The end portions of the carcass layer 6 in the tire lateral direction are formed into folded back portions by being folded back around the pair of bead cores 50 from inward to outward in the tire lateral direction, and the carcass layer 6 is wound in a toroidal shape in the tire circumferential direction to form the framework of the tire. The carcass layer 6 is made of a plurality of coating rubber-covered carcass cords (not illustrated) disposed side by side with an angle with respect to the tire circumferential direction along the tire meridian direction at an angle with respect to the tire circumferential direction. The carcass cords are made of organic fibers (e.g., polyester, rayon, nylon, and the like). The carcass layer 6 is provided with at least one layer, and in the present embodiment, two layers are provided. As illustrated in FIG. 1, the carcass layer 6 is formed such that an end portion 6a on the tire outer side of the two layers at the folded-back portion, in which the two layers are folded back, covers the entire first bead filler rubber 51 and reaches the sidewall portion 4, and an end portion 6a on the tire inner side at the folded-back portion partially covers the first bead filler rubber 51 in the tire radial direction. Note that, while not illustrated in the drawings, in a case where the carcass layer 6 includes a single layer, the end portion 6a at the folded back portion extends to the tire-radial-direction inner side of the belt layer 7 (belt 71).

The belt layer 7 has a multilayer structure in which at least two belts 71, 72 are layered. In the tread portion 2, the belt layer 7 is disposed outward of the carcass layer 6 in the tire radial direction, i.e., on the outer circumference thereof, and covers the carcass layer 6 in the tire circumferential direction. The belts 71, 72 are made of coating rubber-covered cords (not illustrated) disposed side by side at a predetermined angle with respect to the tire circumferential direction (e.g., from 20 degrees to 30 degrees). The cords are made of steel or organic fibers (polyester, rayon, nylon, or the like). Moreover, the belts 71, 72 overlap each other and are disposed so that the direction of the cords of the respective belts intersect each other.

The belt reinforcing layer 8 is disposed outward of the belt layer 7 in the tire radial direction, i.e., on the outer circumference thereof, and covers the belt layer 7 in the tire circumferential direction. The belt reinforcing layer 8 is made of coating rubber-covered cords (not illustrated) disposed side by side in the tire lateral direction and substantially parallel (±5 degrees) to the tire circumferential direction. The cords are made of steel or organic fibers (polyester, rayon, nylon, or the like). The belt reinforcing layer 8 illustrated in FIG. 1 includes two layers covering all of the belt layer 7 and one layer located between the two layers to cover the end portions of the belt layer 7 in the tire lateral direction. The configuration of the belt reinforcing layer 8 is not limited to that described above. While not illustrated in the drawings, a configuration may be used in which, for example, the belt reinforcing layer 8 includes one layer disposed covering all of the belt layer 7 or two layers disposed covering the end portions of the belt layer 7 in the tire lateral direction. Additionally, while not illustrated in the drawings, a configuration of the belt reinforcing layer 8 may be used in which, for example, the belt reinforcing layer 8 is disposed and covers only the end portions of the belt layer 7 in the tire lateral direction. In other words, the belt reinforcing layer 8 overlaps with at least the end portion of the belt layer 7 in the tire lateral direction. Additionally, the belt reinforcing layer 8 is configured by winding a band-like (e.g., with a width of 10 mm) strip material in the tire circumferential direction.

The innerliner layer 9 is the tire inner surface, i.e., the inner circumferential surface of the carcass layer 6 and reaches the bead cores 50 of the pair of bead portions 5 at both end portions in the tire lateral direction. The innerliner layer 9 is wound in a toroidal shape in the tire circumferential direction and bonded to the bead cores 50. The innerliner layer 9 prevents air molecules from escaping from the tire. Note that, as illustrated in FIG. 1, the innerliner layer 9 is disposed extending to the lower portions of the bead cores 50 (inward in the tire radial direction). However, the innerliner layer 9 may be disposed extending to a position on the tire inner side of the bead portion 5.

The side reinforcing rubber 10 is disposed within the sidewall portions 4 neither inwardly nor outwardly exposed. The side reinforcing rubber 10 is provided between the carcass layer 6 and the innerliner layer 9, corresponding to the tire inner side of the carcass layer 6, and has a crescent shaped meridian cross-section. In the present embodiment, the side reinforcing rubber 10 includes tire-radial-direction outer ends 10a each reaching the tread portion 2 and specifically a tire-radial-direction inner side of the belt layer 7 (belt 71); and tire-radial-direction inner ends 10b each reaching the bead portion 5 and specifically a tire-radial-direction outer side of the bead core 50. On the tire-radial-direction outer side of the bead core 50, the tire-radial-direction inner end 10b reaches an arrangement range H1 of the first bead filler rubber 51 in the tire radial direction and an arrangement range H2 of the second bead filler rubber 52 in the tire radial direction. Note that, in the present embodiment, the tire-radial-direction inner end 10b of the side reinforcing rubber 10 lies further inward, in the tire radial direction, of a tire radial direction inner end 52b of the second bead filler rubber 52. The side reinforcing rubber 10 is formed of a rubber material that has a strength greater than that of the rim cushion rubber 5A of the bead portions 5 or that of the side rubber 4A of the sidewall portions 4. Additionally, the side reinforcing rubber 10 may be formed of a plurality of types of rubber that are different in, for example, tan δ at 60° C. or JIS-A hardness at 20° C.

Here, the run-flat tire 1 of the present embodiment is mounted on a vehicle (not illustrated) with the bead portions 5 assembled on the rim and inflated to a predetermined air pressure. When the vehicle travels, the tread surface 21 comes into contact with the road surface while the run-flat tire 1 rotates. When the vehicle is travelling, since the tread surface 21 comes into contact with the road surface as described above, a load including the weight of the vehicle is borne by the tread surface 21. In the case of the tread surface 21 bearing such a load, the run-flat tire 1 elastically deforms in a manner governed by the nature of the load and/or hardness of the parts of the tire, but the air with which the tire is inflated acts on the inside of the tire to expand the tire in the outward direction. A biasing force resulting from the air with which the tire is inflated prevents excessive deformation of the run-flat tire 1, even in a case where the tread surface 21 bears a load. Accordingly, the run-flat tire 1 can rotate while bearing a load, thus allowing the vehicle to travel.

The run-flat tire 1 of the present embodiment is prevented from readily deforming due to the air pressure of the air with which the tire is inflated as described above. However, while the vehicle is traveling, a foreign material may pierce the tread surface 21 and cause a puncture, for example, thus causing air from inside the run-flat tire 1 to escape. When air from inside the run-flat tire 1 escapes, the biasing force from the air acting on the inside of the run-flat tire 1 to expand the run-flat tire 1 outward decreases in strength. When a load is borne by the tread surface 21 of the deflated run-flat tire 1, the tire-radial-direction load is borne by the sidewall portions 4. As a result, the sidewall portions 4 are susceptible to elastic deformation in the tire radial direction. However, these sidewall portions 4 are provided with the side reinforcing rubbers 10, and the bead portion 5 is provided with the bead filler rubber 51, 52. As described above, the side reinforcing rubber 10 is formed of a rubber material with a strength greater than that of the side rubber 4A forming the sidewall portions 4. Accordingly, the side reinforcing rubber 10 suppresses deformation of the sidewall portions 4 in the tire radial direction even in a case where the sidewall portions 4 bear a tire-radial-direction load. Additionally, the bead filler rubber 51, 52 suppresses deformation of the bead portion 5 in the tire radial direction even in a case where the bead portion 5 bears a tire-radial-direction load. As a result, the run-flat tire 1, by virtue of the side reinforcing rubber 10 and the bead filler rubber 51, 52, suppresses deformation of the sidewall portions 4 and the bead portions 5 in the tire radial direction, allowing travel of the vehicle and enabling what is called run-flat travel in which the vehicle travels with the air inside the run-flat tire 1 escaping.

In the run-flat tire 1 capable of run-flat traveling, the bead portions 5 are positioned and assembled on a regular rim and the run-flat tire 1 is brought into an unloaded state or a state equivalent to the unloaded state; in the unloaded state, the run-flat tire 1 is assembled on the regular rim and has an internal pressure of 0 kPa. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO).

In a meridian cross section of the run-flat tire 1 of the present embodiment in the above-described state, a tire-radial-direction height of the first bead filler rubber 51 (tire-radial-direction position of a tire-radial-direction outer end 51a) satisfies the tire-radial-direction arrangement range H1 of 15% or greater and 40% or less of the tire cross-sectional height SH as illustrated in FIG. 2. Additionally, in the run-flat tire 1 of the present embodiment, a tire-radial-direction height of the second bead filler rubber 52 (tire-radial-direction position of a tire-radial-direction outer end 52a) satisfies the tire-radial-direction arrangement range H2 of 35% or greater and 55% or less of the tire cross-sectional height SH. Additionally, in the run-flat tire 1 of the present embodiment, a distance W of a straight line X connecting the tire-radial-direction outer end 52a to the tire-radial-direction inner end 52b of the second bead filler rubber 52 (hereinafter referred to as a linear distance) satisfies a range of 20% or greater and 45% or less of the tire cross-sectional height SH. Additionally, in the run-flat tire 1 of the present embodiment, the second bead filler rubber 52 has a larger cross-sectional area than the first bead filler rubber 51. Note that, in the present embodiment, the tire-radial-direction height of the second bead filler rubber 52 (tire-radial-direction position of the tire-radial-direction outer end 52a) is arranged outward of the tire-radial-direction height of the first bead filler rubber 51 (tire-radial-direction position of the tire-radial-direction outer end 51a).

Tire cross-sectional height SH refers to one-half of a difference between a tire outer diameter and a rim diameter when the run-flat tire 1 is mounted on a regular rim, inflated to a regular internal pressure, and in an unloaded state (see FIG. 1). "Regular internal pressure" refers to a "maximum air pressure" defined by JATMA, the maximum value in "TIRE LOAD LIMITS AT VARIOUS COLD INFLATION PRESSURES" defined by TRA, or "INFLATION PRESSURES" defined by ETRTO.

In the run-flat tire 1 of the present embodiment configured as described above, the first bead filler rubber 51 is provided within the tire-radial-direction arrangement range H1 of 15% or greater and 40% or less of the tire cross-sectional height SH, the second bead filler rubber 52 is provided within the tire-radial-direction arrangement range H2 of 35% or greater and 55% or less of the tire cross-sectional height SH, and the linear distance W between the tire-radial-direction outer end 52a and the tire-radial-direction inner end 52b of the second bead filler rubber 52 is set within the range of 20% or greater and 45% or less of the tire cross-sectional height SH. This enables an appropriate rubber gauge (rubber amount) to be ensured for the bead portions 5, allowing appropriate run-flat durability performance to be ensured. Additionally, the second bead filler rubber 52 has a larger cross-sectional area than the first bead filler rubber 51. This enables the first bead filler rubber 51 to be reduced in size, allowing the ride comfort performance to be ensured. As a result, both run-flat durability performance and ride comfort performance can be achieved in a compatible manner.

Note that, when the tire-radial-direction height of the first bead filler rubber 51 (tire-radial-direction position of the tire-radial-direction outer end 51a) is less than 15% of the tire cross-sectional height SH, an appropriate rubber gauge (rubber amount) fails to be ensured for the bead portions 5, resulting in degraded run-flat durability performance. On the other hand, when the tire-radial-direction height of the first bead filler rubber 51 (tire-radial-direction position of the tire-radial-direction outer end 51a) is greater than 40% of the tire cross-sectional height SH, an excess rubber gauge (rubber amount) is set for the bead portions 5, degrading the ride comfort performance. Furthermore, a heat build-up occurs in the rubber to degrade the run-flat durability performance.

Additionally, when the tire-radial-direction height of the second bead filler rubber 52 (tire-radial-direction position of the tire-radial-direction outer end 52a) is less than 35% of the tire cross-sectional height SH, an appropriate rubber gauge (rubber amount) fails to be ensured for the bead portions 5, resulting in degraded run-flat durability performance. On the other hand, when the tire-radial-direction height of the second bead filler rubber 52 (tire-radial-direction position of the tire-radial-direction outer end 52a) is greater than 55% of the tire cross-sectional height SH, an excess rubber gauge (rubber amount) is set for the bead portions 5, degrading the ride comfort performance. Furthermore, a heat build-up occurs in the rubber to degrade the run-flat durability performance.

Additionally, when the linear distance W between the tire-radial-direction outer end 52a and the tire-radial-direction inner end 52b of the second bead filler rubber 52 is less than 20% of the tire cross-sectional height SH, an appropriate rubber gauge (rubber amount) fails to be ensured for the bead portions 5, resulting in degraded run-flat durability performance. On the other hand, when the linear distance W between the tire-radial-direction outer end 52a and the tire-radial-direction inner end 52b of the second bead filler rubber 52 is greater than 45% of the tire cross-sectional height SH, an excess rubber gauge (rubber amount) is set for the bead portions 5, degrading the ride comfort performance.

Furthermore, a heat build-up occurs in the rubber to degrade the run-flat durability performance.

The following configuration is preferable for ensuring an appropriate rubber gauge (rubber amount) for the bead portions 5 and ensuring appropriate ride comfort performance. The first bead filler rubber 51 is provided within the tire-radial-direction arrangement range H1 of 20% or greater and 37% or less of the tire cross-sectional height SH, the second bead filler rubber 52 is provided within the tire-radial-direction arrangement range H2 of 40% or greater and 52% or less of the tire cross-sectional height SH, and the linear distance W between the tire-radial-direction outer end 52a and the tire-radial-direction inner end 52b of the second bead filler rubber 52 is set within the range of 25% or greater and 40% or less of the tire cross-sectional height SH.

Additionally, in the run-flat tire 1 of the present embodiment, preferably, a total of the cross-sectional area of the first bead filler rubber 51 and the cross-sectional area of the second bead filler rubber 52 satisfies a range of 25% or greater and 45% or less of a cross-sectional area of the side reinforcing rubber 10.

In a case where the total of the cross-sectional area of the first bead filler rubber 51 and the cross-sectional area of the second bead filler rubber 52 is 25% or greater of the cross-sectional area of the side reinforcing rubber 10, a larger rubber gauge (rubber amount) can be ensured for the bead portions 5, allowing the run-flat durability performance to be improved. On the other hand, in a case where the total of the cross-sectional area of the first bead filler rubber 51 and the cross-sectional area of the second bead filler rubber 52 is 45% or less of the cross-sectional area of the side reinforcing rubber 10, an excess rubber gauge (rubber amount) in the bead portions 5 is inhibited, allowing the ride comfort performance to be improved. Furthermore, a possible heat build-up in the rubber is inhibited to allow appropriate run-flat durability performance to be ensured.

The following configuration is more preferable for ensuring an appropriate rubber gauge (rubber amount) for the bead portions 5 and ensuring appropriate ride comfort performance. The total of the cross-sectional area of the first bead filler rubber 51 and the cross-sectional area of the second bead filler rubber 52 satisfies a range of 28% or greater and 42% or less of the cross-sectional area of the side reinforcing rubber 10.

Additionally, in the run-flat tire 1 of the present embodiment, preferably, in the meridian cross section, in a case where a normal line PL is drawn that is normal to an inner surface of the innerliner layer 9 (tire inner side surface) and that passes through a midpoint P of a straight line V connecting the tire-radial-direction outer end 51a of the first bead filler rubber 51 to the tire-radial-direction inner end 10b of the side reinforcing rubber 10, a total of a thickness GA1 of the first bead filler rubber 51 on the normal line PL and a thickness GA2 of the second bead filler rubber 52 on the normal line PL satisfies a range of 60% or greater and 90% or less of a maximum thickness GBmax of the side reinforcing rubber 10, and a thickness GB of the side reinforcing rubber 10 on the normal line PL satisfies a range of 15% or greater and 40% or less of the maximum thickness GBmax of the side reinforcing rubber 10.

Here, the thickness GA1 of the first bead filler rubber 51 is a dimension between carcass cords of the carcass layer 6 inside the folded back portions of the carcass layer 6. Additionally, the thickness GA2 of the second bead filler rubber 52 is a dimension between the carcass cords of the carcass layer 6 along the second bead filler rubber 52 and a boundary between the second bead filler rubber 52 and the rim cushion rubber 5A. Additionally, the maximum thickness GBmax of the side reinforcing rubber 10 is a dimension between the carcass cords of the carcass layer 6 and a boundary between the side reinforcing rubber 10 and the innerliner layer 9, that is, a maximum dimension of the normal line normal to the inner surface of the innerliner layer 9 (tire inner side surface). Additionally, the thickness GB of the side reinforcing rubber 10 is a dimension between the innerliner layer 9 and the carcass cords of the carcass layer 6.

In a case where the total of the thickness GA1 of the first bead filler rubber 51 and the thickness GA2 of the second bead filler rubber 52 is 60% or greater of the maximum thickness GBmax of the side reinforcing rubber 10, a larger rubber gauge (rubber amount) can be ensured for the bead portions 5, allowing the run-flat durability performance to be improved. On the other hand, in a case where the total of the thickness GA1 of the first bead filler rubber 51 and the thickness GA2 of the second bead filler rubber 52 is 90% or less of the maximum thickness GBmax of the side reinforcing rubber 10, an excess rubber gauge (rubber amount) in the bead portions 5 is inhibited, allowing the ride comfort performance to be improved. Furthermore, a possible heat build-up in the rubber is inhibited to allow appropriate run-flat durability performance to be ensured.

Additionally, in a case where the thickness GB of the side reinforcing rubber 10 on the normal line PL is 15% or greater of the maximum thickness GBmax of the side reinforcing rubber 10, a larger rubber gauge (rubber amount) can be ensured for the bead portions 5, allowing the run-flat durability performance to be improved. On the other hand, in a case where the thickness GB of the side reinforcing rubber 10 on the normal line PL is 40% or less of the maximum thickness GBmax of the side reinforcing rubber 10, an excess rubber gauge (rubber amount) in the bead portions 5 is inhibited, allowing the ride comfort performance to be improved. Furthermore, a possible heat build-up in the rubber is inhibited to allow appropriate run-flat durability performance to be ensured.

The following configuration is more preferable for ensuring an appropriate rubber gauge (rubber amount) for the bead portions 5 and ensuring appropriate ride comfort performance. The total of the thickness GA1 of the first bead filler rubber 51 and the thickness GA2 of the second bead filler rubber 52 is 65% or greater and 85% or less of the maximum thickness GBmax of the side reinforcing rubber 10, and the thickness GB of the side reinforcing rubber 10 on the normal line PL is 20% or greater and 39% or less of the maximum thickness GBmax of the side reinforcing rubber 10 on the normal line PL.

Additionally, in the run-flat tire 1 of the present embodiment, preferably, a distance L between a straight line Va extending parallel with the normal line PL and through the tire-radial-direction outer end 51a of the first bead filler rubber 51 and a straight line Vb extending parallel with the normal line PL and through the tire-radial-direction inner end 10b of the side reinforcing rubber 10 satisfies a range of 10 mm or greater and 25% or less of the tire cross-sectional height SH.

In a case where the distance L between the straight line Va extending parallel with the normal line PL and through the tire-radial-direction outer end 51a of the first bead filler rubber 51 and the straight line Vb extending parallel with the normal line PL and through the tire-radial-direction inner end 10b of the side reinforcing rubber 10 is 10 mm or greater, appropriate rigidity of the bead portions 5 is ensured to allow the run-flat durability performance to be improved.

On the other hand, in a case where the distance L is 25% or less of the tire cross-sectional height SH, an excess rubber gauge (rubber amount) in the bead portions 5 is inhibited to allow the ride comfort performance to be improved. Furthermore, a possible heat build-up in the rubber is inhibited to allow appropriate run-flat durability performance to be ensured.

The following configuration is more preferable for ensuring appropriate rigidity of the bead portions 5 and inhibiting excess rigidity of the bead portions 5. The distance L satisfies a range of 15 mm or greater and 25% or less of the tire cross-sectional height SH.

Additionally, in the run-flat tire 1 of the present embodiment, preferably, the thickness GA1 of the first bead filler rubber 51 on the normal line PL is smaller than the thickness GA2 of the second bead filler rubber 52.

The first bead filler rubber 51 arranged inside the folded back portions of the carcass layer 6 is reduced in size, thus inhibiting excess rigidity of the bead portions 5 to allow the ride comfort performance to be improved.

Note that, for improving ride comfort performance, the thickness GA1 of the first bead filler rubber 51 on the normal line PL is 50% or greater and less than 90% of the thickness GA2 of the second bead filler rubber 52.

Additionally, in the run-flat tire 1 of the present embodiment, preferably, the position of the maximum thickness GBmax of the side reinforcing rubber 10 lies outward, in the tire radial direction, of 90% of the range H2 of the tire-radial-direction height of the second bead filler rubber 52 from the tire-radial-direction inner side and lies inward, in the tire radial direction, of 60% of the tire cross-sectional height SH, and the maximum thickness GBmax of the side reinforcing rubber 10 satisfies a range of 35% or greater and 50% or less of a maximum thickness GCmax of the sidewall portions 4.

In a case where the position of the maximum thickness GBmax of the side reinforcing rubber 10 lies outward, in the tire radial direction, of 90% of the tire-radial-direction height of the second bead filler rubber 52, an overlap between the side reinforcing rubber 10 and the second bead filler rubber 52 is small, thus inhibiting excess rigidity to allow the ride comfort performance to be improved. Additionally, in a case where the position of the maximum thickness GBmax of the side reinforcing rubber 10 lies inward, in the tire radial direction, of 60% of the tire cross-sectional height SH, the portion of the maximum thickness GBmax of the side reinforcing rubber 10 lies further inward, in the tire radial direction, of a portion that is very flexible and contributes significantly to the ride comfort performance (the portion lying in the vicinity of an end of the belt layer 7 between the shoulder portion 3 and the sidewall portion 4 and also lying in the vicinity of the tire-radial-direction outer end of the side reinforcing rubber 10). This inhibits excess rigidity to allow the ride comfort performance to be improved.

Moreover, in a case where the maximum thickness GBmax of the side reinforcing rubber 10 is 35% or greater of the maximum thickness GCmax of the sidewall portions 4, appropriate rigidity of the side reinforcing rubber 10 is ensured to allow the run-flat durability performance to be improved. On the other hand, in a case where the maximum thickness GBmax of the side reinforcing rubber 10 is 50% or less of the maximum thickness GCmax of the sidewall portions 4, excess rigidity of the side reinforcing rubber 10 is inhibited to allow the ride comfort performance to be improved. Furthermore, a possible heat build-up in the rubber resulting from an excess rubber gauge (rubber amount) is inhibited to allow appropriate run-flat durability performance to be ensured.

The following configuration is more preferable for ensuring appropriate rigidity of the side reinforcing rubber 10 and inhibiting excess rigidity of the side reinforcing rubber. The maximum thickness GBmax of the side reinforcing rubber 10 satisfies a range of 40% or greater and 50% or less of the maximum thickness GCmax of the sidewall portions 4.

Additionally, in the run-flat tire 1 of the present embodiment, preferably, the side reinforcing rubber 10 has a tan δ of a range of 0.01 or greater and 0.08 or less at 60° C. and has a JIS-A hardness of a range of 72 or greater and 82 or less at 20° C., and at least one of the first bead filler rubber 51 or the second bead filler rubber 52 has a tan δ of a range of 0.01 or greater and 0.08 or less at 60° C. and has a JIS-A hardness of a range of 67 or greater and 77 or less at 20° C.

Here, tan δ is as measured according to JIS-K 6394 using a viscoelastic spectrometer (available from Toyo Seiki Seisaku-sho, Ltd.) at a frequency of 20 Hz, an initial strain of 10%, a dynamic strain of ±2%, and a temperature of 60° C. JIS-A hardness is the durometer hardness measured in accordance with JIS K-6253 using a type A durometer and under a temperature of 20° C.

The side reinforcing rubber 10 having a tan δ of 0.01 or greater at 60° C. is advantageous in terms of productivity and costs of rubber compositions, and the side reinforcing rubber 10 having a tan δ of 0.08 or less at 60° C. can have a rigidity (hardness) advantageous to the run-flat durability performance. Additionally, the side reinforcing rubber 10 having a JIS-A hardness of 72 or greater at 20° C. can have a hardness advantageous to the run-flat durability performance, and the side reinforcing rubber 10 having a JIS-A hardness of 82 or less at 20° C. can have a softness advantageous to the ride comfort performance.

Moreover, at least one of the first bead filler rubber 51 or the second bead filler rubber 52 having a tan δ of 0.01 or greater at 60° C. is advantageous in terms of productivity and costs of rubber compositions, and at least one of the first bead filler rubber 51 or the second bead filler rubber 52 having a tan δ of 0.08 or less at 60° C. can have a rigidity (hardness) advantageous to the run-flat durability performance. Additionally, at least one of the first bead filler rubber 51 or the second bead filler rubber 52 having a JIS-A hardness of 67 or greater at 20° C. can have a hardness advantageous to the run-flat durability performance, and at least one of the first bead filler rubber 51 or the second bead filler rubber 52 having a JIS-A hardness of 77 or less at 20° C. can have a softness advantageous to the ride comfort performance.

Note that, in the run-flat tire 1 of the present embodiment, preferably, the first bead filler rubber 51 and the second bead filler rubber 52 have a tan δ of a range of 0.01 or greater and 0.08 or less at 60° C. and have a JIS-A hardness of a range of 67 or greater and 77 or less at 20° C.

The first bead filler rubber 51 and the second bead filler rubber 52 having a tan δ of 0.01 or greater at 60° C. are advantageous in terms of productivity and costs of rubber compositions, and the first bead filler rubber 51 and the second bead filler rubber 52 having a tan δ of 0.08 or less at 60° C. can have a rigidity (hardness) advantageous to the run-flat durability performance. Additionally, the first bead filler rubber 51 and the second bead filler rubber 52 having a JIS-A hardness of 67 or greater at 20° C. can have a hardness advantageous to the run-flat durability performance, and the first bead filler rubber 51 and the second bead filler rubber 52 having a JIS-A hardness of 77 or less at 20° C. can have a softness advantageous to the ride comfort performance.

Preferably, the side reinforcing rubber 10 has a tan δ of a range of 0.01 or greater and 0.06 or less at 60° C. in order to be advantageous in terms of productivity and costs of rubber compositions, and to have a rigidity (hardness) advantageous to the run-flat durability performance. Additionally, more preferably, the side reinforcing rubber 10 has a JIS-A hardness of a range of 74 or greater and 80 or less at 20° C. in order to have a hardness advantageous to the run-flat durability performance and to have a softness advantageous to the ride comfort performance. Additionally, more preferably, the first bead filler rubber 51 and the second bead filler rubber 52 have a tan δ of a range of 0.01 or greater and 0.07 or less at 60° C. in order to be advantageous in terms of productivity and costs of rubber compositions, and to have a rigidity (hardness) advantageous to the run-flat durability performance. Additionally, more preferably, the first bead filler rubber 51 and the second bead filler rubber 52 have a JIS-A hardness of a range of 69 or greater and 75 or less at 20° C. in order to have a hardness advantageous to the run-flat durability performance and to have a softness advantageous to the ride comfort performance.

EXAMPLES

In the examples, performance tests for run-flat durability performance and ride comfort performance were performed on a plurality of types of run-flat tires (pneumatic tires) of different conditions (see FIGS. 3A-3B).

In the performance tests, run-flat tires (test tires) of tire size 235/50R18 were assembled on regular rims of 18×7.5J. The run-flat tires have a tire cross-sectional height of 117 mm.

For evaluation of the run-flat durability performance, the test tires are mounted on four wheels of a test vehicle (FR drive (front-engine, rear-wheel-drive system) passenger vehicle of 4.6 L engine displacement). The internal pressure of a right rear wheel is set to 0 kPa, and the internal pressures of the other wheels are set to a regular value of 230 kPa. The vehicle travels on a test course of dry road surfaces at 80 km/h on average. Traveling distance is measured until vibration is felt that results from a tire failure in the right rear wheel. The measurement results are expressed as index values and evaluated with the Conventional Example being assigned as the reference (100). In the evaluation, larger index values indicate a longer traveling distance and superior run-flat durability performance.

For evaluation of the ride comfort performance, the above-described test vehicle traveled on the test course of the dry road surfaces under the same conditions. Sensory evaluation was conducted by experienced drivers for items such as straight-line stability during straight traveling; and turning stability, rigidity feeling, and steering characteristics during lane changes and during cornering. Based on the sensory evaluation, the measurements results are expressed as index values and evaluated with the Conventional Example being assigned as the reference (100). In the evaluation, larger index values indicate superior ride comfort performance.

In FIGS. 3A-3B, run-flat tires in the conventional example include the first bead filler rubber but not the second bead filler rubber. Run-flat tires in Comparative Example 1 and Comparative Example 2 include the first bead filler rubber and the second bead filler rubber but fail to satisfy specifications for the first bead filler rubber and the second bead filler rubber. On the other hand, run-flat tires in Examples 1 to 9 include the first bead filler rubber and the second bead filler rubber and satisfy the specifications for the first bead filler rubber and the second bead filler rubber.

As can be seen from the test results of FIGS. 3A-3B, the run-flat tires in Examples 1 to 9 achieve both run-flat durability performance and ride comfort performance in a compatible manner.

The invention claimed is:

1. A run-flat tire, comprising:
a tread portion;
sidewall portions arranged on opposite sides of the tread portion;
bead portions arranged inward of the sidewall portions in a tire radial direction;
a carcass layer extending from the tread portion through the sidewall portions to the bead portions, end portions of the carcass layer being folded back at the bead portions outward in a tire lateral direction, the carcass layer being wound in a tire circumferential direction;
an innerliner layer arranged around an inner circumference of the carcass layer;
side reinforcing rubber arranged between the carcass layer and the innerliner layer in each of the sidewall portions;
first bead filler rubber arranged inside each of the folded back portions of the carcass layer; and
second bead filler rubber arranged outward of each of the folded back portions of the carcass layer in the tire lateral direction and along the carcass layer; wherein
in a meridian cross-section,
a tire-radial-direction height of the first bead filler rubber satisfies a range of 15% or greater and 40% or less of a tire cross-sectional height,
a tire-radial-direction height of the second bead filler rubber satisfies a range of 35% or greater and 55% or less of the tire cross-sectional height,
a linear distance from a tire-radial-direction outer end to a tire-radial-direction inner end of the second bead filler rubber satisfies a range of 20% or greater and 45% or less of the tire cross-sectional height,
the second bead filler rubber has a larger cross-sectional area than the first bead filler rubber, and
in the meridian cross-section on opposite sides of the tread portion:
a total of the cross-sectional area of the first bead filler rubber and the cross-sectional area of the second bead filler rubber satisfies a range of 25% or greater and 45% or less of a cross-sectional area of the side reinforcing rubber,
a normal line is drawn that is normal to an inner surface of the innerliner layer and that passes through a midpoint of a straight line connecting a tire-radial-direction outer end of the first bead filler rubber to a tire-radial-direction inner end of the side reinforcing rubber,
a total of a thickness of the first bead filler rubber on the normal line and a thickness of the second bead filler rubber on the normal line satisfies a range of 60% or greater and 90% or less of a maximum thickness of the side reinforcing rubber, and
a thickness of the side reinforcing rubber on the normal line satisfies a range of 15% or greater and 40% or less of the maximum thickness of the side reinforcing rubber.

2. The run-flat tire according to claim 1, wherein
in the meridian cross-section on opposite sides of the tread portion,
a distance between a straight line extending parallel with the normal line and through the tire-radial-direction outer end of the first bead filler rubber and a straight line extending parallel with the normal line and through the tire-radial-direction inner end of the side reinforcing rubber satisfies a range of 10 mm or greater and 25% or less of the tire cross-sectional height.

3. The run-flat tire according to claim 1, wherein on opposite sides of the tread portion
a position of the maximum thickness of the side reinforcing rubber lies outward, in the tire radial direction, of 90% of the tire-radial-direction height of the second bead filler rubber and inward, in the tire radial direction, of 60% of the tire cross-sectional height, and
the maximum thickness of the side reinforcing rubber satisfies a range of 35% or greater and 50% or less of a maximum thickness of the sidewall portion.

4. The run-flat tire according to claim 1, wherein
the side reinforcing rubber has a tan δ of a range of 0.01 or greater and 0.08 or less at 60° C. and has a JIS-A hardness of a range of 72 or greater and 82 or less at 20° C., and
at least one of the first bead filler rubber or the second bead filler rubber has a tan δ of a range of 0.01 or greater and 0.08 or less at 60° C. and has a JIS-A hardness of a range of 67 or greater and 77 or less at 20° C.

5. The run-flat tire according to claim 1, wherein
the side reinforcing rubber has a tan δ of a range of 0.01 or greater and 0.08 or less at 60° C. and has a JIS-A hardness of a range of 72 or greater and 82 or less at 20° C., and
the first bead filler rubber and the second bead filler rubber have a tan δ of a range of 0.01 or greater and 0.08 or less at 60° C. and have a JIS-A hardness of a range of 67 or greater and 77 or less at 20° C.

6. The run-flat tire according to claim 1, wherein
in the meridian cross-section on opposite sides of the tread portion,
the thickness of the first bead filler rubber on the normal line is smaller than the thickness of the second bead filler rubber on the normal line.

7. The run-flat tire according to claim 6, wherein on opposite sides of the tread portion
a position of the maximum thickness of the side reinforcing rubber lies outward, in the tire radial direction, of 90% of the tire-radial-direction height of the second bead filler rubber and inward, in the tire radial direction, of 60% of the tire cross-sectional height, and
the maximum thickness of the side reinforcing rubber satisfies a range of 35% or greater and 50% or less of a maximum thickness of the sidewall portion.

8. The run-flat tire according to claim 7, wherein
the side reinforcing rubber has a tan δ of a range of 0.01 or greater and 0.08 or less at 60° C. and has a JIS-A hardness of a range of 72 or greater and 82 or less at 20° C., and
at least one of the first bead filler rubber or the second bead filler rubber has a tan δ of a range of 0.01 or greater and 0.08 or less at 60° C. and has a JIS-A hardness of a range of 67 or greater and 77 or less at 20° C.

9. The run-flat tire according to claim 8, wherein
the first bead filler rubber and the second bead filler rubber have the tan δ of a range of 0.01 or greater and 0.08 or less at 60° C. and have the JIS-A hardness of a range of 67 or greater and 77 or less at 20° C.

10. A run-flat tire, comprising:

a tread portion;

sidewall portions arranged on opposite sides of the tread portion;

bead portions arranged inward of the sidewall portions in a tire radial direction;

a carcass layer extending from the tread portion through the sidewall portions to the bead portions, end portions of the carcass layer being folded back at the bead portions outward in a tire lateral direction, the carcass layer being wound in a tire circumferential direction;

an innerliner layer arranged around an inner circumference of the carcass layer;

side reinforcing rubber arranged between the carcass layer and the innerliner layer in each of the sidewall portions;

first bead filler rubber arranged inside each of the folded back portions of the carcass layer; and second bead filler rubber arranged outward of each of the folded back portions of the carcass layer in the tire lateral direction and along the carcass layer; wherein in a meridian cross-section, a tire-radial-direction height of the first bead filler rubber satisfies a range of 15% or greater and 40% or less of a tire cross-sectional height, a tire-radial-direction height of the second bead filler rubber satisfies a range of 35% or greater and 55% or less of the tire cross-sectional height, a linear distance from a tire-radial-direction outer end to a tire-radial-direction inner end of the second bead filler rubber satisfies a range of 20% or greater and 45% or less of the tire cross-sectional height, the second bead filler rubber has a larger cross-sectional area than the first bead filler rubber, and in the meridian cross-section on opposite sides of the tread portion:

a normal line is drawn that is normal to an inner surface of the innerliner layer and that passes through a midpoint of a straight line connecting a tire-radial-direction outer end of the first bead filler rubber to a tire-radial-direction inner end of the side reinforcing rubber, a total of a thickness of the first bead filler rubber on the normal line and a thickness of the second bead filler rubber on the normal line satisfies a range of 60% or greater and 90% or less of a maximum thickness of the side reinforcing rubber, and a thickness of the side reinforcing rubber on the normal line satisfies a range of 15% or greater and 40% or less of the maximum thickness of the side reinforcing rubber.

* * * * *